T. R. DU BOIS.
ENGINE STARTER AND GENERATOR.
APPLICATION FILED MAR. 4, 1915. RENEWED SEPT. 10, 1919.
1,348,555.
Patented Aug. 3, 1920.
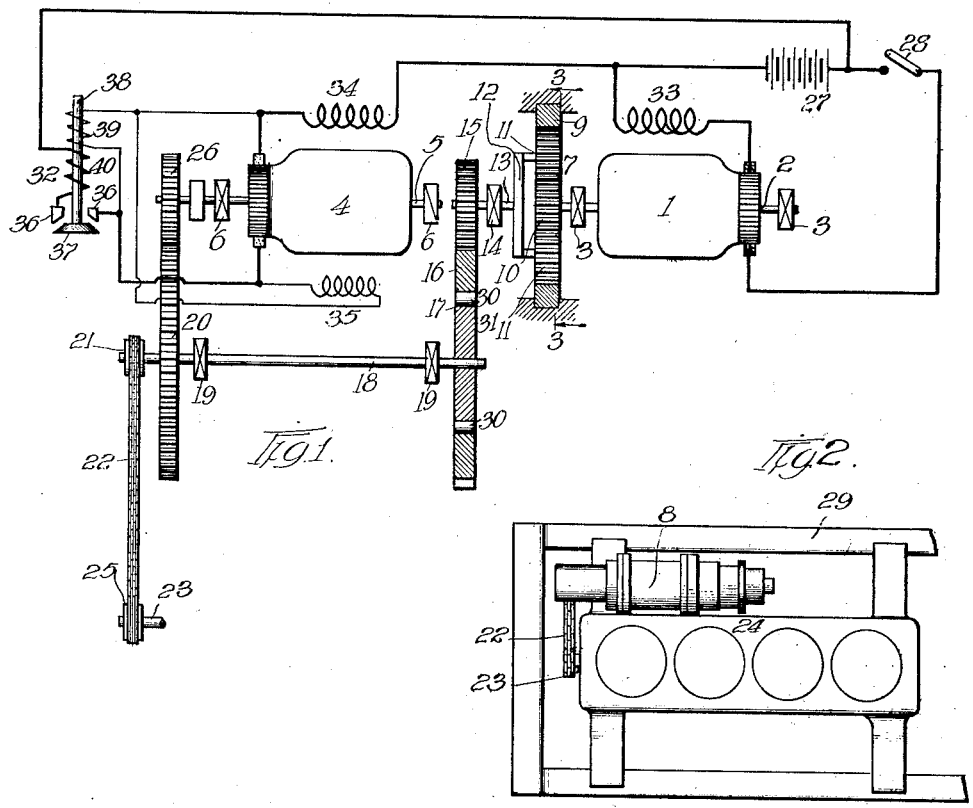
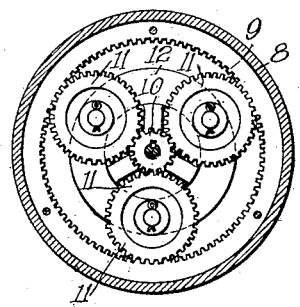
Witnesses:
Inventor:
Thomas R. Du Bois.
By Edwin B. H. Tower Jr. atty.

UNITED STATES PATENT OFFICE.

THOMAS R. DU BOIS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ENGINE STARTER AND GENERATOR.

1,348,555.      Specification of Letters Patent.    Patented Aug. 3, 1920.

Application filed March 4, 1915, Serial No. 11,979. Renewed September 10, 1919. Serial No. 322,984.

*To all whom it may concern:*

Be it known that I, THOMAS R. DU BOIS, a citizen of the United States, residing at Niagara Falls, in the county of Niagara and State of New York, have invented new and useful Improvements in Engine Starters and Generators, of which the following is a full, clear, concise, and exact description, reference being had to the accompanying drawing, forming a part of this specification.

This invention relates to engine starters and generators.

It is one of the objects of the present invention to provide a simple, reliable and particularly compact engine starter and generator.

It is another object of the invention to provide a practical double-unit engine starter and generator in which suitable speed reduction is obtained, yet occupying a minimum of space.

Still another object is to provide a convenient arrangement of the different units and working parts so that the device may be applied to stock machines wherein the available space is limited.

Other objects will be in part obvious and in part pointed out hereinafter.

In the accompanying drawings, wherein is shown one of the various possible embodiments of the invention—

Figure 1 is a diagrammatic view of an apparatus embodying the invention.

Fig. 2 is a diagrammatic view showing an internal combustion engine with starter and generator attached.

Fig. 3 is a section taken on the line 3, 3, of Fig. 1.

The present embodiment of the invention comprises a motor unit 1 having its armature shaft 2 supported in suitable bearings 3, and a generator unit 4 having an armature shaft 5 supported in suitable bearings 6. The axes of the two units are in longitudinal alinement.

Power transmission devices comprising a system of planetary gearing 7 are interposed between the motor 1 and an internal combustion engine, for the purpose of obtaining suitable reduction in speed. In order that the generator may be driven from the engine, when the latter operates by its own power, power transmission devices are provided between these elements.

Both units and the working parts of the transmission are inclosed by a suitable housing as indicated at 8 in Fig. 2. Fixed to the interior of the housing 8 is an internal gear 9, coaxially arranged with the motor shaft 2. A pinion 10 is fixed on one end of the motor shaft 2 and arranged between this pinion and the internal gear 9 are a number of planetary gears 11, the teeth of which mesh respectively with the teeth of the internal gear and the pinion. These planet gears are supported by a ring or spider 12 which is fixed to a short shaft 13 which is in turn mounted for rotation in a bearing 14. The planet gears 11 are loosely mounted on the spider 12 and adapted to rotate relatively thereto. A gear 15 is mounted to rotate with the shaft 13 and drive a gear 16, which, through the overrunning clutch 17, drives a counter-shaft 18. This counter-shaft is mounted in suitable bearings 19 and carries a gear 20 and a sprocket 21. A silent sprocket chain 22 connects the counter-shaft 18 with the crank-shaft 23 of an internal combustion engine 24 through the medium of sprocket 21 and a sprocket 25 mounted on said crank shaft. The gear 20 meshes with a pinion 26 on the generator shaft 5.

A storage battery, from which the motor is energized, is shown at 27. A starting switch is indicated at 28 and the chassis of an automobile is indicated at 29 in Fig. 2, to demonstrate the manner in which the combined starter and generator may be attached to automobiles constructed without special design for the accommodation of such systems.

Much difficulty has been experienced in providing starting and generating systems for automobiles, not particularly designed for the accommodation thereof, because of the fact that little space is available between the engine and the hood or frame, especially in view of the fact that it is desirable to obtain a substantial reduction of speed between the motor and the crank shaft of the engine for starting purposes. The present device is extremely compact and the desired speed reduction is obtained.

In the operation of the device, closure of the starting switch 28 energizes the motor 1 from the storage battery 27. The pinion 10 is driven by the motor and through the planetary gearing transmits power at a reduced speed to the shaft 13 and its gear 15. Further speed reduction occurs between the shaft 13 and the counter-shaft 18, which is arranged directly below the generator shaft 5 by reason of the large diameter of the gear 16. Rollers 30 are moved into wedging engagement with the gear 16 and a ratchet-shaped member 31, fixed to the counter-shaft 18, and power is transmitted to the engine crank shaft 23. The engine is turned over, compression and ignition take place and the engine commences to operate under its own power. At this time the starting switch 28 should be opened by the operator and as the speed of the counter-shaft 18 becomes greatly accelerated, the member 31 will be rotated at a greater rate of speed than is imparted to the gear 16 by the momentum of the motor 1. This causes the rollers 30 to be released from their position of wedged engagement between the two parts of the clutch, and the generator 4 is driven by means of the gears 20 and 26 while the motor unit remains idle. When the generator voltage builds up to a predetermined value, as for instance, a value equal to that of the battery voltage, the automatic switch 32 will be operated.

It will be noted that the motor 1 has a series field winding 33 and that the generator 4 has a series field winding 34 and a shunt field winding 35. A pair of contacts 36 provide a normally open generating circuit and a bridging member 37 on a solenoid 38 is adapted, when the solenoid is operated, to close the generating circuit across the contacts 36. Energization of a shunt coil 39 to the proper degree, effects movement of the solenoid core to close the circuit and immediately the circuit becomes closed, the series coil 40 acts cumulatively with the coil 39 to hold the switch in position. If, however, the speed of the generator falls to a point permitting current to flow from the battery to the generator, the coil 40 will act in opposition to the coil 39 and open the switch.

The compact arrangement of the parts is to be particularly noted. The fact is important that the two units are arranged in axial alinement while, at the same time, a substantial speed reduction is obtained. The construction set forth may be conveniently housed in a casing of comparativcley small dimensions, both in diameter and length.

As many changes may be made in the construction and many apparently widely different embodiments of this invention could be made without departing from the scope thereof, it is intended that all matter contained in the above description or shown in the accompanying drawings shall be interpreted as illustrative and not in a limiting sense.

What I claim as new and desire to secure by Letters Patent of the United States, is:—

1. In an engine starter and generator, in combination, a motor and a generator having their respective armatures mounted on separate shafts and having their axes in alinement, an internal combustion engine, a counter-shaft between the axial line of the motor and generator and the axis of the engine crank shaft, power transmitting connections between the crank shaft and said counter-shaft, power transmitting connections between said counter-shaft and the generator shaft, and means whereby said engine may be driven from said motor and automatically operatively disconnected therefrom when the generator rotates at or above a predetermined speed.

2. In an engine starter and generator, in combination, a motor and a generator having their respective armatures mounted on separate shafts and having their axes in alinement, an internal combustion engine, a counter-shaft between the axial line of the motor and generator and the axis of the engine crank shaft, power transmitting connections between the crank shaft and the countershaft, power transmitting connections between said counter-shaft and the generator shaft, and means comprising a system of planetary gearing and an overrunning clutch whereby said engine may be driven from said motor and automatically operatively disconnected therefrom when the generator rotates at or above a predetermined speed.

3. In an engine starter and generator, in combination, a motor and a generator having their respective armatures mounted on separate shafts and having their axes in alinement, an internal combustion engine, a counter-shaft between the axial line of the motor and generator and the axis of the engine crank shaft, chain and sprocket connections between the crank shaft and counter-shaft, gear connections between said counter-shaft and the generator shaft, and means whereby said engine may be driven from said motor and automatically operatively disconnected therefrom when the generator rotates at or above a predetermined speed.

4. In an engine starter and generator, in combination, a motor and a generator having their respective armatures mounted on separate shafts and having their axes in alinement, an internal combustion engine, a counter-shaft between the axial line of the motor and generator and the axis of the engine crank shaft, chain and sprocket connections between the crank shaft and the counter-shaft, gear connections between said counter-shaft and the generator shaft, and means comprising a system of planetary gearing and an over-running clutch whereby said engine may be driven from said motor and automatically operatively disconnected therefrom when the generator rotates at or above a predetermined speed.

5. In an engine starter and generator, in combination, a motor and a generator having their respective armatures mounted on separate parallel shafts, an internal combustion engine, a counter-shaft parallel to said armature shafts and the axis of the engine crank shaft, power transmitting connections between the crank shaft and said counter-shaft, power transmitting connections between said counter-shaft and the generator shaft, and means whereby said engine may be driven from said motor and automatically operatively disconnected therefrom when the generator rotates at or above a predetermined speed.

6. In an engine starter and generator, in combination, a motor and a generator having their respective armatures mounted on separate parallel shafts, an internal combustion engine, a counter-shaft parallel to said armature shafts and the axis of the engine crank shaft, power transmitting connections between the crank shaft and the counter-shaft, power transmitting connections between said counter-shaft and the generator shaft, and means comprising a system of planetary gearing and an over-running clutch whereby said engine may be driven from said motor and automatically operatively disconnected therefrom when the generator rotates at or above a predetermined speed.

7. In an engine starter and generator, in combination, a motor and a generator having their respective armatures mounted on separate parallel shafts, an internal combustion engine, a counter-shaft parallel to said armature shafts and the axis of the engine crank shaft, chain and sprocket connections between the crank shaft and counter-shaft, gear connections between said counter-shaft and the generator shaft, and means whereby said engine may be driven from said motor and automatically operatively disconnected therefrom when the generator rotates at or above a predetermined speed.

8. In an engine starter and generator, in combination, a motor and a generator having their respective armatures mounted on separate parallel shafts, an internal combustion engine, a counter-shaft parallel to said armature shafts and the axis of the engine crank shaft, chain and sprocket connections between the crank shaft and the counter-shaft, gear connections between said counter-shaft and the generator shaft, and means comprising a system of planetary gearing and an overrunning clutch whereby said engine may be driven from said motor and automatically operatively disconnected therefrom when the generator rotates at or above a predetermined speed.

In witness whereof, I have hereunto subscribed my name in the presence of two witnesses.

THOMAS R. DU BOIS.

Witnesses:
JESSE A. HOLTON,
D. E. QUILINARY.